(12) United States Patent
Cho (10) Patent No.: US 10,982,796 B2
(45) Date of Patent: Apr. 20, 2021

(54) DUAL PIPE

(71) Applicant: Han Yong Cho, Yongin-si (KR)

(72) Inventor: Han Yong Cho, Yongin-si (KR)

( * ) Notice: Subject to any disclaimer, the term of this patent is extended or adjusted under 35 U.S.C. 154(b) by 0 days.

(21) Appl. No.: 16/639,935

(22) PCT Filed: Aug. 17, 2018

(86) PCT No.: PCT/KR2018/009432
§ 371 (c)(1),
(2) Date: Feb. 18, 2020

(87) PCT Pub. No.: WO2019/035675
PCT Pub. Date: Feb. 21, 2019

(65) Prior Publication Data
US 2020/0248845 A1    Aug. 6, 2020

(30) Foreign Application Priority Data

Aug. 18, 2017 (KR) .......................... 10-2017-0104767

(51) Int. Cl.
*F16L 9/18* (2006.01)
*F25B 41/00* (2021.01)

(52) U.S. Cl.
CPC ................ *F16L 9/18* (2013.01); *F25B 41/00* (2013.01)

(58) Field of Classification Search
CPC ...... F16L 9/18; F16L 9/19; F28D 7/10; F28D 7/106; F28D 7/02; F28D 21/00; F28D 2021/0068

USPC ........ 138/114, 108, 177; 165/154, 156, 184, 165/141, 181, 169, 179
See application file for complete search history.

(56) References Cited

U.S. PATENT DOCUMENTS

| 2,204,294 | A | * | 6/1940 | Blanchard | ............... | F01N 13/08 |
| | | | | | | 261/159 |
| 3,777,343 | A | * | 12/1973 | D'Onofrio | ............. | B21D 15/04 |
| | | | | | | 29/890.036 |
| 4,111,402 | A | * | 9/1978 | Barbini | ...................... | B01F 3/10 |
| | | | | | | 138/38 |
| 7,255,096 | B2 | * | 8/2007 | Craig | ...................... | F28D 7/103 |
| | | | | | | 123/568.12 |

(Continued)

FOREIGN PATENT DOCUMENTS

| JP | 2004-226045 A | 8/2004 |
| JP | 2007-175756 A | 7/2007 |

(Continued)

*Primary Examiner* — Patrick F Brinson
(74) *Attorney, Agent, or Firm* — Novick, Kim & Lee, PLLC; Jae Youn Kim (57) ABSTRACT

A dual pipe includes an outer pipe having a valley/ridge portion on an outer circumferential surface thereof, and an inner pipe having a valley/ridge portion formed on an inner circumferential surface thereof and inserted into the outer pipe. In the dual pipe, the inner pipe and the outer pipe are threadedly engaged with each other. A low pressure refrigerant passes through the inner pipe. In order to secure a passage of a high pressure refrigerant in a space between the outer circumferential surface of the inner pipe and the inner circumferential surface of the outer pipe, a part of the helical valley/ridge portion formed on the outer circumferential surface of the inner pipe is composed of a multiple-helix helical valley/ridge portion.

8 Claims, 8 Drawing Sheets

(56) References Cited

U.S. PATENT DOCUMENTS

| | | | | |
|---|---|---|---|---|
| 7,886,420 B2* | 2/2011 | Naganawa | ............... | F28F 1/426 |
| | | | | 29/525.13 |
| 9,791,074 B2* | 10/2017 | Hoglund | ................. | B01J 8/067 |
| 10,371,453 B2* | 8/2019 | Lee | ........................ | F28F 1/426 |
| 2011/0073208 A1* | 3/2011 | Nakamura | ................ | F16L 7/00 |
| | | | | 138/114 |
| 2013/0025834 A1* | 1/2013 | Choi | ....................... | F28F 1/426 |
| | | | | 165/156 |
| 2014/0109373 A1* | 4/2014 | Nakamura | ............... | F25B 40/00 |
| | | | | 29/428 |
| 2018/0045467 A1* | 2/2018 | Lee | ...................... | F28F 9/0234 |
| 2019/0100079 A1* | 4/2019 | Lee | ........................ | F25B 41/40 |
| 2020/0284520 A1* | 9/2020 | Lee | ........................ | F28D 7/024 |

FOREIGN PATENT DOCUMENTS

| | | |
|---|---|---|
| JP | 2012-193869 A | 10/2012 |
| JP | 2014-009831 A | 1/2014 |
| KR | 10-2011-1104141 A | 9/2011 |

* cited by examiner

DUAL PIPE

TECHNICAL FIELD

The present invention relates to a dual pipe for use in a refrigeration cycle. More particularly, the present invention relates to a dual pipe including an inner pipe configured to form an inner passage for a refrigerant and an outer pipe configured to surround the inner pipe so as to form an outer passage for the refrigerant together with the inner pipe.

BACKGROUND ART

A dual pipe is a device for use in a refrigeration cycle and is a device for improving the efficiency of a refrigeration cycle by ensuring that heat exchange occurs effectively between a refrigerant passing through an inner passage and a refrigerant passing through an outer passage.

U.S. Pat. No. 7,866,378 (Patent Document 1) entitled "DOUBLE-WALL PIPE, METHOD OF MANUFACTURING THE SAME AND REFRIGERANT CYCLE DEVICE PROVIDED WITH THE SAME" and U.S. Pat. No. 9,669,499 (Patent Document 2) entitled "DOUBLE-WALL PIPE, METHOD OF MANUFACTURING THE SAME AND REFRIGERANT CYCLE DEVICE PROVIDED WITH THE SAME" disclose a dual pipe for use in a refrigeration cycle. The dual pipe disclosed in the above patent documents includes an outer pipe and an inner pipe inserted into the outer pipe. The inner pipe forms an inner passage for a refrigerant. The space defined by the outer circumferential surface of the inner pipe and the inner circumferential surface of the outer pipe forms an outer passage for the refrigerant.

A plurality of valley/ridge portions extending helically in the longitudinal direction is formed on the outer circumferential surface of the inner pipe. The helical valley/ridge portions are formed by pressing the outer circumferential surface of the inner pipe so that a part of the outer circumferential surface of the inner pipe is recessed along the longitudinal direction. The recessed portions of the outer circumferential surface are valleys, and the non-recessed portions are ridges. Helical valley/ridge portions are not formed on the inner circumferential surface of the outer pipe. In addition, the inner pipe and the outer pipe are bent. Each of the inner pipe and the outer pipe includes a straight portion and a bent portion. The inner diameter of the straight portion of the outer pipe is larger than the imaginary outer diameter defined by the ridges of the inner pipe, so that the inner circumferential surface of the outer pipe and the ridges of the inner pipe do not contact each other in a certain portion. Furthermore, the inner circumferential surface of the bent portion of the outer pipe is configured to make contact with the valleys of the inner pipe. Therefore, the dual pipe disclosed in the above patents is configured so that a refrigerant flows through the helical valleys of the inner pipe and the space between ridges of the inner pipe and the inner circumferential surface of the outer pipe in the straight portion, and flows through the valleys of the inner pipe in the bent portion.

In addition, U.S. Pat. No. 7,886,420 (Patent Document 3) entitled "METHOD OF MANUFACTURING DOUBLE PIPE" discloses a method of manufacturing a dual pipe for use in a refrigeration cycle of a motor vehicle. Circular grooves are formed on the outer circumferential surfaces of the opposite end portions of an inner pipe, and holes are formed in the opposite end portions of an outer pipe. The method of manufacturing a dual pipe disclosed in the above patent includes a step of fixing one end of an outer pipe to an inner pipe, a step of simultaneously bending the inner pipe and the outer pipe, and a step of fixing the other end of the outer pipe to the inner pipe. In the above steps, the circular grooves of the opposite end portions of the inner pipe and the holes of the opposite end portions of the outer pipe are arranged at positions corresponding to each other.

In addition, U.S. Pat. No. 7,887,099 (Patent Document 4) entitled "COMPOUND TUBE AND METHOD OF PRODUCING THE SAME" discloses a configuration for firmly fixing an outer pipe to an inner pipe in a dual pipe. That is, the above patent discloses a dual pipe in which tapering portions are formed on the inner circumferential surfaces of the opposite end portions of the outer pipe, annular swage portions are formed near the opposite end portions having the tapering portions, and the outer pipe is firmly fixed to the inner pipe by brazing.

In the dual pipes disclosed in Patent Documents 1 to 4, the inner circumferential surface of the outer pipe constituting the straight portion and the ridges of the inner pipe are not fixed to each other. Therefore, when vibration propagates to the dual pipe, there is a possibility that, due to the contact of the inner circumferential surface of the outer pipe and the ridges of the inner pipe, frictional noise may be generated and contact portions may be damaged. In addition, if a plurality of bent portions is formed in the dual pipe, difficulties are involved in manufacturing the dual pipe, and the possibility of generation of noise and damage due to vibration grows higher.

Meanwhile, International Publication WO 2017/038961 (Patent Document 5) entitled "METHOD FOR MANUFACTURING DOUBLE PIPE" discloses a method of manufacturing a dual pipe. The dual pipe manufacturing method disclosed in Patent Document 5 is intended to solve the problems of the dual pipe manufacturing methods disclosed in Patent Documents 1 to 4. The dual pipe manufacturing method disclosed in Patent Document 5 includes inserting an inner pipe having an outer diameter smaller than an inner diameter of an outer pipe into the outer pipe, forming a recess by depressing a part of the outer pipe to which the inner pipe is inserted, and fixing the outer pipe and the inner pipe by bringing the recess of the outer pipe into contact with the outer circumferential surface of the inner pipe. The method disclosed in Patent Document 5 is characterized in that the inserting step is facilitated by increasing the difference between the inner diameter of the outer pipe and the outer diameter of the inner pipe, and the inner pipe and the outer pipe are fixed by forming the recess by applying an external force to the outer circumferential surface of the outer pipe to which the inner pipe is inserted. Furthermore, Patent Document 5 discloses a method of fixing an inner pipe and an outer pipe by forming a bent portion and then forming a recess in the outer pipe.

PRIOR ART DOCUMENTS

Patent Documents

Patent Document 1: U.S. Pat. No. 7,866,378 entitled "DOUBLE-WALL PIPE, METHOD OF MANUFACTURING THE SAME AND REFRIGERANT CYCLE DEVICE PROVIDED WITH THE SAME"

Patent Document 2: U.S. Pat. No. 9,669,499 entitled "DOUBLE-WALL PIPE, METHOD OF MANUFACTURING THE SAME AND REFRIGERANT CYCLE DEVICE PROVIDED WITH THE SAME"

Patent Document 3: U.S. Pat. No. 7,886,420 entitled "METHOD OF MANUFACTURING DOUBLE PIPE"

Patent Document 4: U.S. Pat. No. 7,887,099 entitled "COMPOUND TUBE AND METHOD OF PRODUCING THE SAME"

Patent Document 5: International Publication WO 2017/038961 entitled "METHOD FOR MANUFACTURING DOUBLE PIPE"

Although the related art is cited above, a market demand has existed for a new dual pipe having excellent performance for use in a refrigeration cycle of a motor vehicle. In particular, there is a market demand for a dual pipe of a new structure that does not generate noise and has a low risk of damage even when vibration propagates thereto. In addition, there is a market demand for a dual pipe having a structure that can be bent in order to improve productivity even after assembling an inner pipe and an outer pipe, and brazing and fixing the opposite end portions of the outer pipe to the inner pipe. There is also a market demand for a dual pipe with better heat exchange efficiency.

SUMMARY

It is an object of the present invention to provide a dual pipe of a new structure for meeting the market demand as described above.

A dual pipe according to present invention includes an outer pipe having a valley/ridge portion on an outer circumferential surface thereof, and an inner pipe having a valley/ridge portion formed on an inner circumferential surface thereof and inserted into the outer pipe. In the dual pipe, the inner pipe and the outer pipe are threadedly engaged with each other. A low pressure refrigerant passes through the inner pipe. In order to secure a passage of a high pressure refrigerant in a space between the outer circumferential surface of the inner pipe and the inner circumferential surface of the outer pipe, a part of the helical valley/ridge portion formed on the outer circumferential surface of the inner pipe is composed of a multiple-helix helical valley/ridge portion. A part of the helical valley/ridge portion formed on the inner circumferential surface of the outer pipe is composed of a single-helix helical valley/ridge portion (more precisely, a helical valley/ridge portion having a smaller number of helixes than the number of helixes of the multiple-helix helical valley/ridge portion of the inner pipe). That is, the high-pressure refrigerant flows through a space between a valley of a non-threadedly-engaged helical valley/ridge portion of the multiple-helix helical valley/ridge portion, which is formed on the outer circumferential surface of the inner pipe, and the outer pipe.

With the dual pipe according to the present invention, the inner pipe and the outer pipe are firmly fixed by the threaded engagement of the helical valley/ridge portions. Therefore, even when vibration propagates to the dual pipe, it is possible to prevent generation of noise or damage due to friction between the inner pipe and the outer pipe. In addition, the portions adjacent to the opposite end portions of the outer pipe are also firmly threadedly engaged with the inner pipe by the helical valley/ridge portions. Therefore, when manufacturing a dual pipe having a bent shape, it is less likely that the fixing portions at the opposite ends are damaged even if the dual pipe is bent after fixing the opposite ends of the outer pipe to the inner pipe. In addition, when assembling the dual pipe and then bending the dual pipe at a desired angle, the passage of the refrigerant is secured in the bent portion by the non-threadedly-engaged valley of the inner pipe, and the inner pipe and the outer pipe are firmly fixed in the bent portion by the threadedly-engaged valley/ridge portions.

In some embodiments, the inner pipe of the dual pipe according to the present invention has a helical valley/ridge portion formed on an outer circumferential surface thereof. The helical valley/ridge portion of the inner pipe includes a first helical inner pipe valley/ridge portion, a second helical inner pipe valley/ridge portion and a third helical inner pipe valley/ridge portion formed sequentially in a longitudinal direction to have the same pitch, the second helical inner pipe valley/ridge portion being a multiple-helix helical valley/ridge portion. The inner pipe further includes a first annular groove formed by reducing an outer diameter of the inner pipe between the first helical inner pipe valley/ridge portion and the second helical inner pipe valley/ridge portion and a second annular groove formed by reducing an outer diameter of the inner pipe between the second helical inner pipe valley/ridge portion and the third helical inner pipe valley/ridge portion.

The outer pipe of the dual pipe according to the present invention includes a first helical outer pipe valley/ridge portion, a second helical outer pipe valley/ridge portion and a third helical outer pipe valley/ridge portion formed on an inner circumferential surface of the outer pipe so as to be threadedly engaged with the first helical inner pipe valley/ridge portion, the second helical inner pipe valley/ridge portion and the third helical inner pipe valley/ridge portion, respectively. Moreover, the outer pipe includes a first through-hole formed between the first helical outer pipe valley/ridge portion and the second helical outer pipe valley/ridge portion and a second through-hole formed between the second helical outer pipe valley/ridge portion and the third helical outer pipe valley/ridge portion. In addition, the dual pipe may further include a first connecting pipe connected to the first through-hole of the outer pipe and a second connecting pipe connected to the second through-hole.

In some embodiments, the first helical outer pipe valley/ridge portion, the second helical outer pipe valley/ridge portion and the third helical outer pipe valley/ridge portion of the outer pipe may be composed of integrally-extending single-helix helical valley/ridge portions.

In some embodiments, the first helical inner pipe valley/ridge portion and the third helical inner pipe valley/ridge portion of the inner pipe may be composed of multiple-helix helical valley/ridge portions. The first helical outer pipe valley/ridge portion and the third helical outer pipe valley/ridge portion of the outer pipe may be composed of multiple-helix helical valley/ridge portions. The second helical outer pipe valley/ridge portion may be composed of a single-helix helical valley/ridge portion.

In some embodiments, the inner pipe may further include a small-diameter connecting portion extending from the third helical inner pipe valley/ridge portion and having an outer circumferential surface diameter smaller than a diameter of an imaginary cylinder defined by an inner circumferential surface of a ridge of the helical valley/ridge portion formed on the inner circumferential surface of the outer pipe. Furthermore, the outer pipe may further include a fixing portion extending from the third helical outer pipe valley/ridge portion. The dual pipe may further include a seal ring inserted between the small-diameter connecting portion of the inner pipe and the fixing portion of the outer pipe.

In some embodiments, the inner pipe may further include a small-diameter connecting portion extending from the third helical inner pipe valley/ridge portion and having an outer circumferential surface diameter smaller than a diameter of an imaginary cylinder defined by an inner circumferential surface of a ridge of the helical valley/ridge portion formed on the inner circumferential surface of the outer pipe. The outer pipe may further include a fixing portion extending from the third helical outer pipe valley/ridge portion so that a fixing portion of the inner pipe is inserted into the fixing portion of the outer pipe.

In some embodiments, if all the helical valley/ridge portions of the inner pipe and the outer pipe are formed by pressing the outer circumferential surfaces of the inner pipe and the outer pipe, the second helical outer pipe valley/ridge portion of the outer pipe and the second helical inner pipe valley/ridge portion of the inner pipe are deformed in a threadedly-engaged state during the bending of the dual pipe. This makes it possible to prevent the deformation of the bent portion from propagating to the opposite end portions of the dual pipe fixed by brazing. In this case, the helical valley/ridge portion is contracted on the inner side of the bent portion, and the helical valley/ridge portion is expanded on the outer side of the bent portion, thereby absorbing the deformation caused by the bending of the inner pipe and the outer pipe. Therefore, when manufacturing the dual pipe, even if the dual pipe is bent after fixing both ends of the outer pipe to the inner pipe by brazing, it is possible to prevent deformation of the bent portions from propagating to the brazed end potions of the dual pipe. This makes it possible to simplify the manufacturing process.

In some embodiments, the dual pipe according to the present invention may be configured by forming one multiple-helix helical valley/ridge portion on the outer circumferential surface of the inner pipe, and forming only one helical valley/ridge portion on the inner circumferential surface of the outer pipe so as to be threadedly engaged with the helical valley/ridge portion of the multiple-helix helical valley/ridge portion of the inner pipe. In the present embodiment, the inner pipe includes an annular groove formed by reducing an outer diameter from one side of the multiple-helix helical valley/ridge portion, a small-diameter connecting portion formed by reducing an outer diameter from the other side of the multiple-helix helical valley/ridge portion, and a large-diameter connecting portion extending from the annular groove. In addition, the outer pipe includes a large-diameter fixing portion and a small-diameter fixing portion. The large-diameter fixing portion includes a helical outer pipe valley/ridge portion formed so as to be threadedly engaged with at least one helical valley/ridge portion of the multiple-helix helical valley/ridge portion, and first and second through-holes formed adjacent to both ends of the helical outer pipe valley/ridge portion. Moreover, the small-diameter connecting portion of the inner pipe has an outer circumferential surface diameter smaller than a diameter of an imaginary cylinder defined by an inner circumferential surface of a ridge formed on an inner circumferential surface of the outer pipe. Furthermore, the outer pipe is configured so that the first through-hole of the large-diameter fixing portion communicates with the annular groove of the inner pipe and the second through-hole of the large-diameter fixing portion communicates with the small-diameter connecting portion of the inner pipe.

With the dual pipe according to the present invention, the inner pipe and the outer pipe are firmly fixed by the threaded engagement of the helical valley/ridge portions. Therefore, even when vibration propagates to the dual pipe, it is possible to prevent generation of noise or damage due to friction between the inner pipe and the outer pipe. In addition, the portions adjacent to the opposite end portions of the outer pipe are also firmly threadedly engaged with the inner pipe by the helical valley/ridge portions. Therefore, when manufacturing a dual pipe having a bent shape, it is less likely that the fixing portions at the opposite ends are damaged even if the dual pipe is bent after fixing the opposite ends of the outer pipe to the inner pipe. In addition, even when the dual pipe is assembled and then bent at a desired angle, the passage of the refrigerant is secured by the valleys of the inner pipe which are not threadedly engaged with the bent portion. At the same time, the threadedly engaged valley/ridge portions firmly fix the inner pipe and the outer pipe in the bent portion. In addition, the dual pipe according to the present invention is configured so that the high-pressure refrigerant passes through the helically-formed passage. Thus, the movement path of the high-pressure refrigerant becomes long, thereby enhancing the performance of heat exchange with the low-pressure refrigerant.

DETAILED DESCRIPTION

Hereinafter, preferred embodiments of the present invention will be described in detail with reference to the accompanying drawings.

Figure 1:
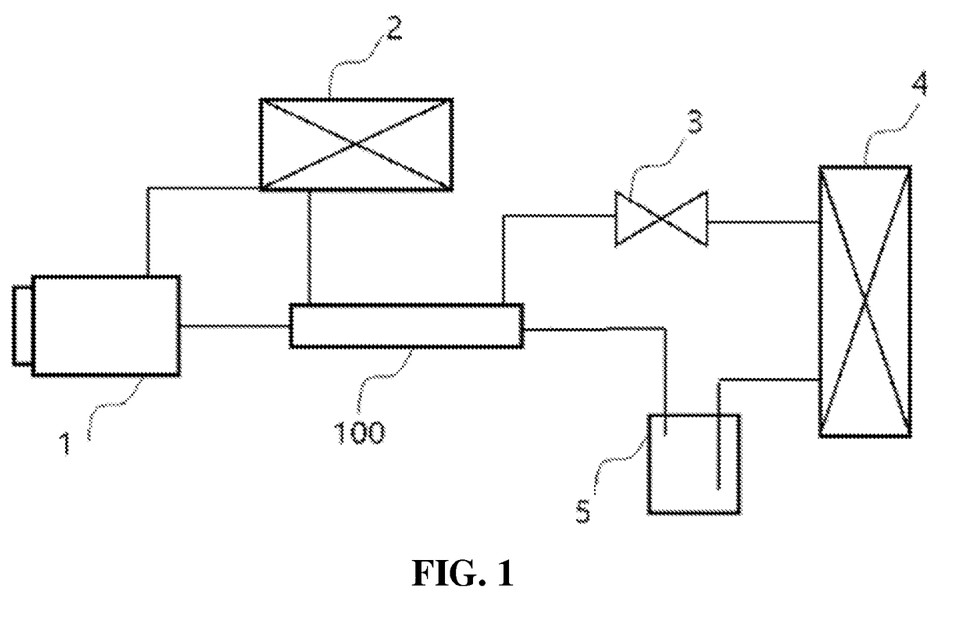
FIG. 1 is a schematic view of a refrigeration cycle in which a dual pipe according to the present invention is used.

FIG. 1 is a schematic view of a refrigeration cycle in which a dual pipe according to the present invention is used. The dual pipe according to the present invention may be used in a refrigeration cycle of a vehicle, but the application thereof is not limited thereto. The refrigeration cycle shown in FIG. 1 is mounted on a vehicle (not shown) to constitute a part of an air conditioner of the vehicle. The refrigeration cycle includes a compressor 1 configured to compress a refrigerant, a radiator 2 configured to cool the refrigerant compressed by the compressor 1, an expansion device 3 configured to depressurize and expand the refrigerant cooled by the radiator 2, and an evaporator 4 configured to evaporate the refrigerant depressurized in the expansion device 3. An accumulator 5 separates the refrigerant discharged from the evaporator 4 into a gaseous refrigerant and a liquid refrigerant, and sends the gaseous refrigerant to the compressor 1. The dual pipe 100 is an internal heat exchanger used for heat exchange between a high-pressure refrigerant supplied from the radiator 2 to the expansion device 3 and a low-pressure refrigerant circulated from the accumulator 5 to the compressor 1.

Figure 2:
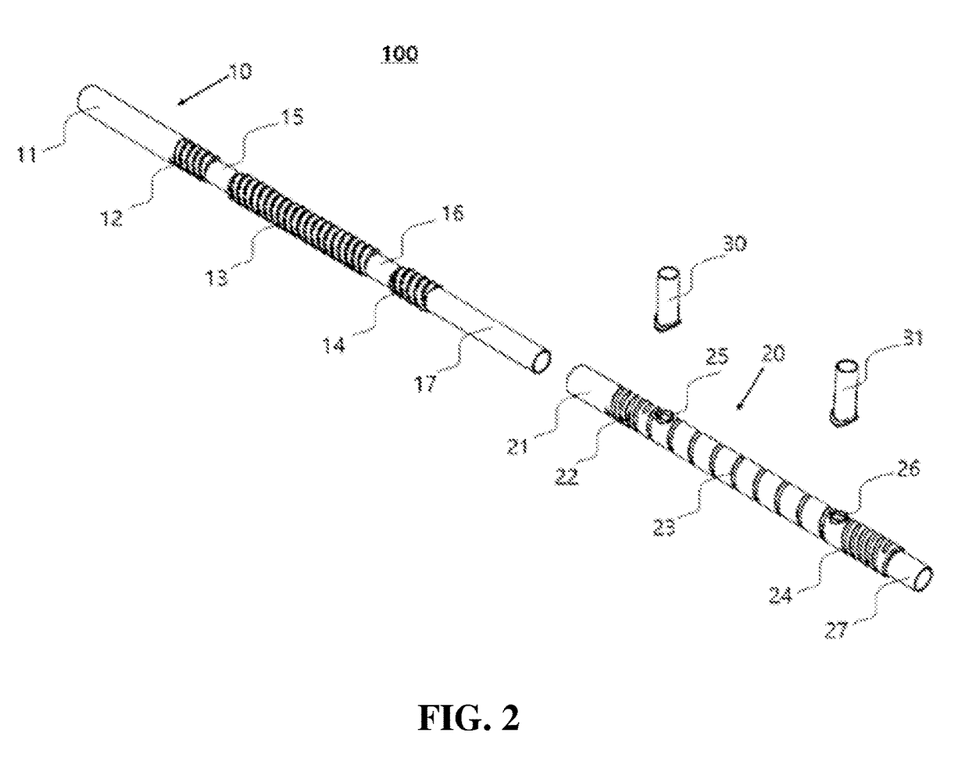
FIG. 2 is an exploded perspective view of a dual pipe according to one embodiment of the present invention.
Figure 3:
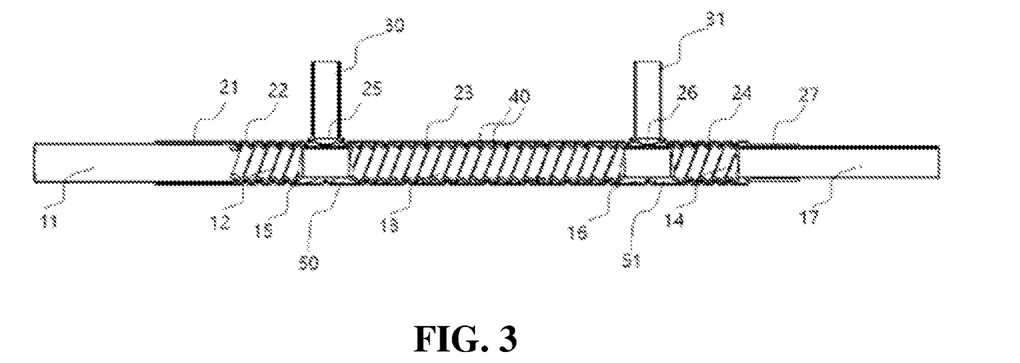
FIG. 3 is a sectional view showing an assembled state of the dual pipe shown in FIG. 1.
Figure 4:
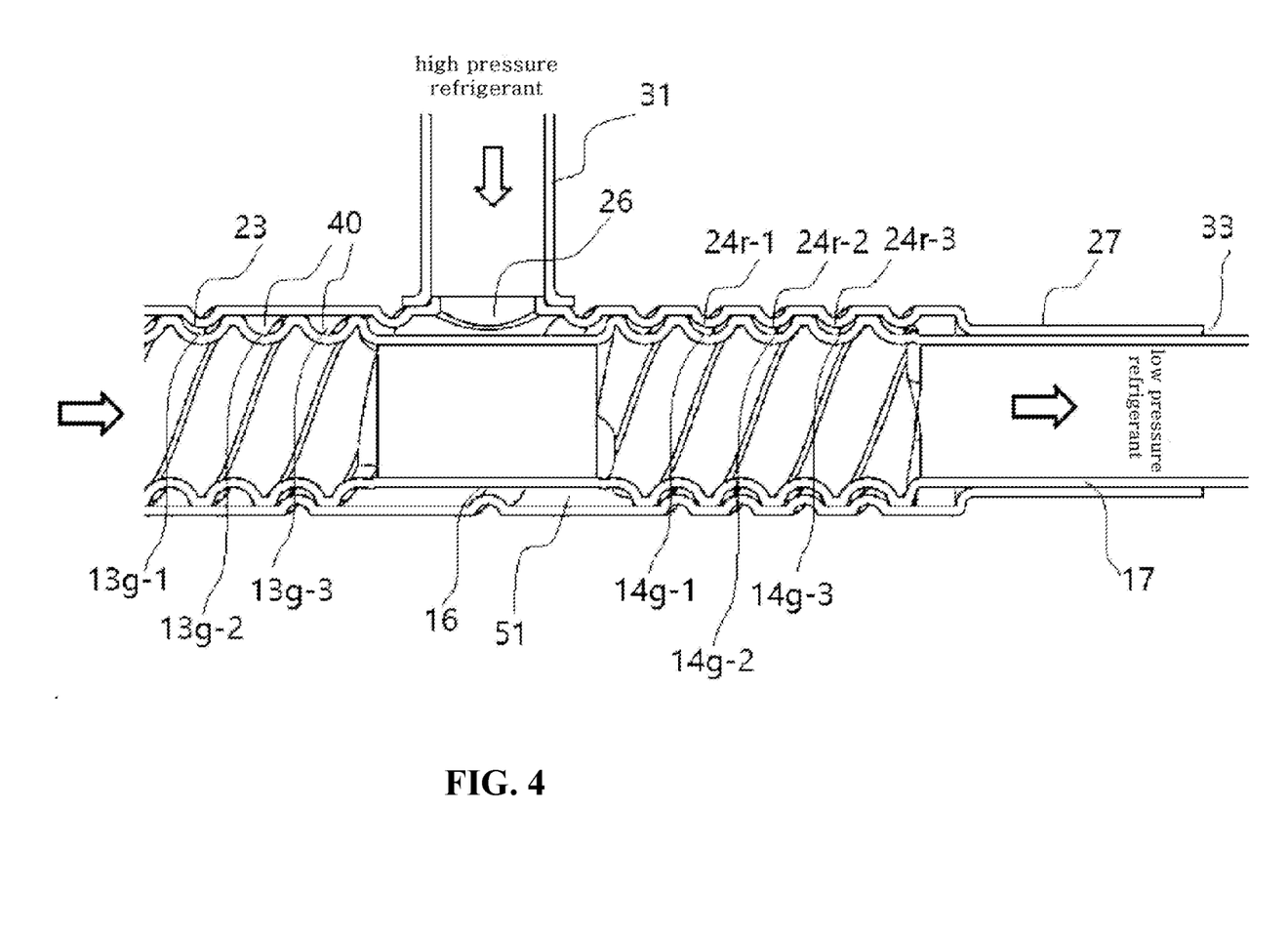
FIG. 4 is a partially enlarged explanatory view of the dual pipe shown in FIG. 2.

FIGS. 2 to 4 show a dual pipe 100 according to one embodiment of the present invention.

Referring to FIG. 1, the dual pipe 100 of the present embodiment includes an inner pipe 10 and an outer pipe 20.

The inner pipe 10 and the outer pipe 20 are made of aluminum. However, the material of the inner pipe 10 and the outer pipe 20 is not limited thereto and may be aluminum, aluminum alloys, copper, copper alloys, engineering plastics or the like. The inner pipe 10 has helical valley/ridge portions 12, 13 and 14 formed on an outer circumferential surface thereof. The helical valley/ridge portions 12, 13 and 14 includes a first helical inner pipe valley/ridge portion 12, a second helical inner pipe valley/ridge portion 13, and a third helical inner pipe valley/ridge portion 14, which are sequentially formed in the longitudinal direction.

The first helical inner pipe valley/ridge portion 12, the second helical inner pipe valley/ridge portion 13 and the third helical inner pipe valley/ridge portion 14 of the inner pipe 10 may have the same pitch and may be respectively formed of a triple-helix helical valley/ridge portions. However, the present invention is not limited thereto. The second helical inner pipe valley/ridge portion 13 needs to be formed of multiple-helix helical valley/ridge portions. For example, the first helical inner pipe valley/ridge portion 12 and the third helical inner pipe valley/ridge portion 14 may be formed of a single-helix helical valley/ridge portion, and the second helical inner pipe valley/ridge portion 13 may be formed of a triple-helix or quadruple-helix helical valley/ridge portion.

In the inner pipe 10, a first annular groove 15 having a reduced outer diameter is formed between the first helical inner pipe valley/ridge portion 12 and the second helical inner pipe valley/ridge portion 13, and a second annular groove 16 having a reduced outer diameter is formed between the second helical inner pipe valley/ridge portion 13 and the third helical inner pipe valley/ridge portion 14. The helical valley/ridge portions 12, 13 and 14 of the inner pipe 10 may be formed by pressing the inner pipe 10 with a ball or the like while rotating the inner pipe 10. A method of forming a helical valley/ridge portion or an annular groove on an outer circumferential surface of a metal pipe is disclosed in Patent documents 1 to 5 cited above.

The outer pipe 20 of the dual pipe 100 includes helical valley/ridge portions 22, 23 and 24 formed on an inner circumferential surface thereof. In the present embodiment, the outer circumferential surface of the outer pipe 20 is pressed and deformed to form the helical valley/ridge portions 22, 23 and 24 on both the inner circumferential surface and the outer circumferential surface thereof. However, the helical valley/ridge portions may be formed only on the inner circumferential surface of the outer pipe 20. The helical valley/ridge portions 22, 23 and 24 of the outer pipe 20 have the same pitch as the helical valley/ridge portions 12, 13 and 14 of the inner pipe 10.

Moreover, in the outer pipe 20, a first through-hole 25 is formed between the first helical outer pipe valley/ridge portion 22 and the second helical outer pipe valley/ridge portion 23, and a second through-hole 26 is formed between the second helical outer pipe valley/ridge portion 23 and the third helical outer pipe valley/ridge portion 24. In addition, a first connecting pipe 30 is connected to the first through-hole 25 of the outer pipe 20, and a second connecting pipe 31 is connected to the second through-hole 25 of the outer pipe 20.

Moreover, the helical valley/ridge portions 12, 13 and 14 of the inner pipe 10 and the helical valley/ridge portions 22, 23 and 24 of the outer pipe 20 have a tolerance suitable for threaded engagement. In addition, the diameter of an imaginary cylinder defined by the ridges of the helical valley/ridge portions 12, 13 and 14 formed on the outer circumferential surface of the inner pipe 10 is smaller than the diameter of an imaginary cylinder defined by the ridges of the helical valley/ridge portions 22, 23 and 24 formed on the inner circumferential surface of the outer pipe 20.

Furthermore, in the present embodiment, the inner pipe 10 includes a large-diameter connecting portion 11 extending from the first helical inner pipe valley/ridge portion 12 and a small-diameter connecting portion 17 extending from the third helical inner pipe valley/ridge portion 14. The large-diameter connecting portion 11 has a diameter slightly smaller than the diameter of the cylinder defined by the outer circumferential surfaces of the ridges of the helical valley/ridge portions 12, 13 and 14 of the inner pipe 10. In addition, the diameter of the outer circumferential surface of the small-diameter connecting portion 17 is smaller than the diameter of the imaginary cylinder defined by the inner circumferential surfaces of the ridges of the valley/ridge portions 22, 23 and 24 formed on the inner circumferential surface of the outer pipe 20. Thus, the small-diameter connecting portion 17 of the inner pipe 10 may be inserted through the outer pipe 10.

In addition, the outer pipe 20 includes a large-diameter fixing portion 21 extending from the first helical outer pipe valley/ridge portion 22 and a small-diameter fixing portion 27 extending from the third helical outer pipe valley/ridge portion 24. The inner diameter of the large-diameter fixing portion 21 of the outer pipe 20 is slightly larger than the outer diameter of the large-diameter connecting portion 11 of the inner pipe 10. The outer pipe 20 also includes a small-diameter fixing portion 27 extending from the third helical outer pipe valley/ridge portion 24. The inner diameter of the small-diameter fixing portion 27 is slightly larger than the outer diameter of the small-diameter connecting portion 17.

In order to assemble the dual pipe 100 of the present embodiment, the small-diameter connecting portion 17 of the inner pipe 10 is inserted into the large-diameter fixing portion 21 of the outer pipe 20. When the outer pipe 20 is rotated to advance, the first helical outer pipe valley/ridge portion 22 of the outer pipe 20 is threadedly engaged with the first helical inner pipe valley/ridge portion 12 of the inner pipe 10, the second helical outer pipe valley/ridge portion 23 is threadedly engaged with the second helical inner pipe valley/ridge portion 13, and the third helical outer pipe valley/ridge portion 24 is threadedly engaged with the third helical inner pipe valley/ridge portion 14. 23. In addition, the large-diameter connecting portion 11 of the inner pipe 10 is inserted into the large-diameter fixing portion 21 of the outer pipe 20, and the small-diameter connecting portion 17 of the inner pipe 10 is inserted into the small-diameter fixing part 27 of the outer pipe 20. For reliable sealing and engagement, the large-diameter connecting portion 11 of the inner pipe 10 and the end portion of the large-diameter fixing portion 21 of the outer pipe 20 are brazed and fixed to each other, and the small-diameter connecting portion 17 of the inner pipe 10 and the end potion of the small-diameter fixing portion 27 of the outer pipe 20 are brazed and fixed to each other.

In the dual pipe 100 of the present embodiment, the large-diameter connecting portion 11 and the small-diameter connecting portion 17 are formed at both ends of the inner pipe 10, and the large-diameter fixing portion 21 and the small-diameter fixing part 27 are formed at both ends of the outer pipe 20. In other embodiments, the connecting potions and the fixing potions may be configured in different forms. For example, the threadedly-engaged opposite end portions of a dual pipe including an inner pipe provided with connecting potions at both ends and an outer pipe provided with no fixing potion at both ends may be directly fixed and sealed by brazing. As another example, the threadedly-engaged opposite end portions of a dual pipe including an inner pipe provided with no connecting potion at both ends and an outer pipe provided with no fixing potion at both ends may be directly fixed and sealed by brazing.

Referring to FIGS. 3 and 4, the second helical inner pipe valley/ridge portion 13 of the inner pipe 10 is a triple-helix helical valley/ridge portion, and the second helical outer pipe valley/ridge portion 23 of the outer pipe 20 is a single-helix helical valley/ridge portion. When the second helical inner pipe valley/ridge portion 13 and the second helical outer pipe valley/ridge portion 23 are threadedly engaged with the first valley 13g-1 of the second helical inner pipe valley/ridge portion 13 of the inner pipe 10, the remaining two valleys 13g-2 and 13g-3 of the second helical inner pipe valley/ridge portion 13 are not threadedly engaged with the second helical outer pipe valley/ridge portion 23. Accordingly, a high-pressure refrigerant passage 40 is formed between the non-threadedly-engaged valleys 13g-2 and 13g-3 of the second helical inner pipe valley/ridge portion 13 of the inner pipe 20 and the inner circumferential surface of the second helical outer pipe valley/ridge portion 23 of the outer pipe 20. The high-pressure refrigerant passage 40 according to the present invention is composed of the valleys 13g-2 and 13g-3 of the second helical inner pipe valley/ridge portion 13 so that the length of the high-pressure refrigerant passage 40 is helically long. In addition, the high pressure refrigerant passing through the passage 40 makes contact with the inner pipe 10 over a larger area than an area in which the high pressure refrigerant makes contact with the outer pipe 20, thereby enhancing the performance of heat exchange with the inner pipe 10.

Furthermore, the first annular groove 15 and the second annular groove 16 of the inner pipe 10 have a reduced diameter so that they can communicate with the non-threadedly-engaged valleys 13g-2 and 13g-3 of the second helical inner pipe valley/ridge portion 13 of the inner pipe 10. Therefore, a high-pressure refrigerant passage 50 is formed between the first annular groove 15 and the first through-hole 25 of the outer pipe 20, and a high-pressure refrigerant passage 51 is formed between the second annular groove 16 and the second through-hole 26 of the outer pipe 20.

Therefore, the high pressure refrigerant supplied to the second connecting pipe 31 passes through the second through-hole 26 and sequentially passes through the passage 50 formed by the second annular groove 16, the passage 40 formed by the second helical inner pipe valley/ridge portion 13, the passage 50 formed by the first annular groove 15, and the first through-hole 25. The high pressure refrigerant is discharged through the first connecting pipe 30. Therefore, the high pressure refrigerant exchanges heat with the low pressure refrigerant passing through the inner pipe 10. In particular, the dual pipe 100 according to the present invention is configured so that the high pressure refrigerant passes through the helically-formed passage 40. Accordingly, the movement path of the high pressure refrigerant becomes long, thereby enhancing the performance of heat exchange with the low pressure refrigerant.

Referring to FIGS. 3 and 4, in the dual pipe 100 of the present embodiment, the first helical outer pipe valley/ridge portion 22 and the third helical outer pipe valley/ridge portion 24 of the outer pipe 20 are triple-helix helical valley/ridge portions, and the first helical inner pipe valley/ridge portion 12 and the third helical inner pipe valley/ridge portion 14 of the inner pipe 10 are also triple-helix helical valley/ridge portions. Therefore, all the helixes of valley/ridge portions formed at both ends of the inner pipe 10 and the outer pipe 20 are threadedly engaged with each other. As shown in FIG. 4, the valleys 14g-1, 14g-2 and 14g-3 of the third helical inner pipe valley/ridge portion 14 of the inner pipe 10 and the ridges 24r-1, 24r-2 and 24r-3 of the third helical outer pipe valley/ridge portion 24 of the outer pipe 20 are all threadedly engaged with each other. Therefore, it is possible to firmly fix the end portions of the inner pipe 10 and the outer pipe 20 of the dual pipe 100 and to prevent the high pressure refrigerant from leaking. In addition, even when the dual pipe 100 is bent after assembling the same, the threadedly-engaged portions of the dual pipe 100 prevent the deformation of the bent portions from propagating to the end portions of the inner pipe 10 and the outer pipe 20. Accordingly, it is possible to prevent the bending or deformation of the dual pipe 100 from propagating to the brazed portions for sealing and fixing the dual pipe 100. This makes it possible to protect the brazed portions.

In particular, if all the helical valley/ridge portions of the inner pipe 10 and the outer pipe 20 are valley/ridge portions formed by pressing the outer circumferential surfaces of the inner pipe 10 and the outer pipe 20, the second helical outer pipe valley/ridge portion 23 of the outer pipe 20 and the second helical inner pipe valley/ridge portion 13 of the inner pipe 10 are deformed in a threadedly-engaged state during the bending of the dual pipe 100. In this case, the helical valley/ridge portion is contracted on the inner side of the bent portion, and the helical valley/ridge portion is expanded on the outer side of the bent portion, thereby absorbing the deformation caused by the bending of the inner pipe 10 and the outer pipe 20. Therefore, when manufacturing the dual pipe 100, even if the dual pipe 100 is bent after both ends of the outer pipe 20 are fixed to the inner pipe 10 by brazing, it is possible to prevent deformation of the bent portions from propagating to the brazed end potions of the dual pipe 100. This makes it possible to simplify the manufacturing process.

Figure 5:
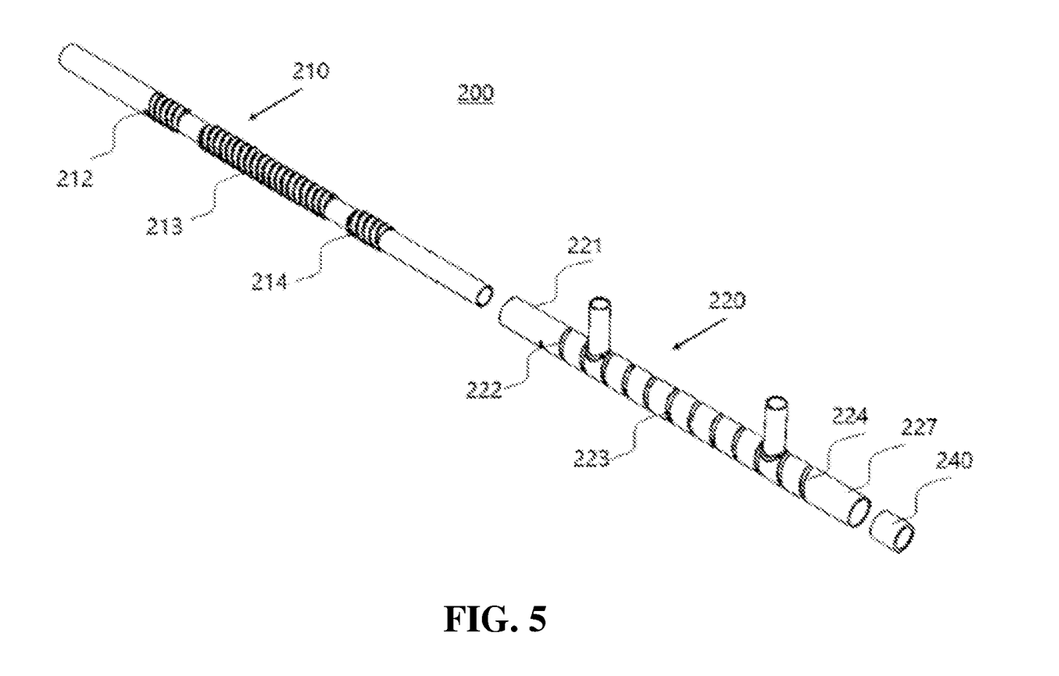
FIG. 5 is an exploded perspective view of a dual pipe according to another embodiment of the present invention.
Figure 6:
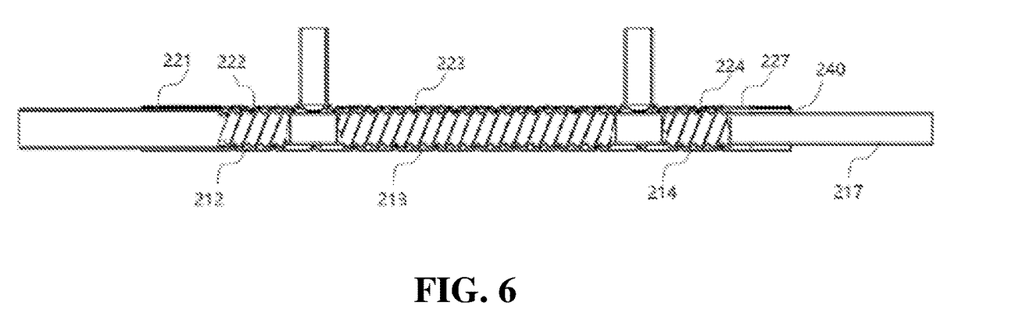
FIG. 6 is a sectional view of the dual pipe shown in FIG. 5.

FIGS. 5 and 6 show a dual pipe 200 according to another embodiment of the present invention. The dual pipe 200 shown in FIG. 5 differs from the dual pipe 100 shown in FIG. 2 in that the first helical outer pipe valley/ridge portion 222, the second helical outer pipe valley/ridge portion 223 and the third helical outer pipe valley/ridge portion 224 of the outer pipe 220 are integrally connected to each other as a single-helix helical valley/ridge portion. In addition, the dual pipe 200 shown in FIG. 5 differs from the dual pipe 100 shown in FIG. 2 in that the diameter of the fixing portion 227 extending from the third helical outer pipe valley/ridge portion 224 is not reduced but is equal to the diameter of the fixing portion 221 extending from the first helical outer pipe valley/ridge portion 222. Reference numerals 212, 213 and 214 denote first to third helical inner pipe valley/ridge portions formed on the outer circumferential surface of the inner pipe 210.

In the dual pipe 200 of the present embodiment, the outer diameter of the small-diameter connecting portion 217 of the inner pipe 210 having a reduced diameter is larger than the inner diameter of the fixing portion 227 of the outer pipe 220 where the diameter of the outer pipe 220 is not reduced. Thus, a gap is formed when the small-diameter connecting portion 217 is inserted into the fixing portion 227. Therefore, a seal ring 240 is inserted between the fixing portion 227 of the outer pipe 220 and the small-diameter connecting portion 217 of the inner pipe 210. The seal ring 240 ensures the sealing of the high pressure refrigerant and facilitates the blazing of the end portion. Needless to say, instead of inserting the seal ring 240, the diameter of the fixing portion 227 may be reduced as in the embodiment shown in FIG. 2, and the fixing portion 227 of the outer pipe 220 may be directly brazed and fixed to the small-diameter connecting portion 217 of the inner pipe 210.

Figure 7:
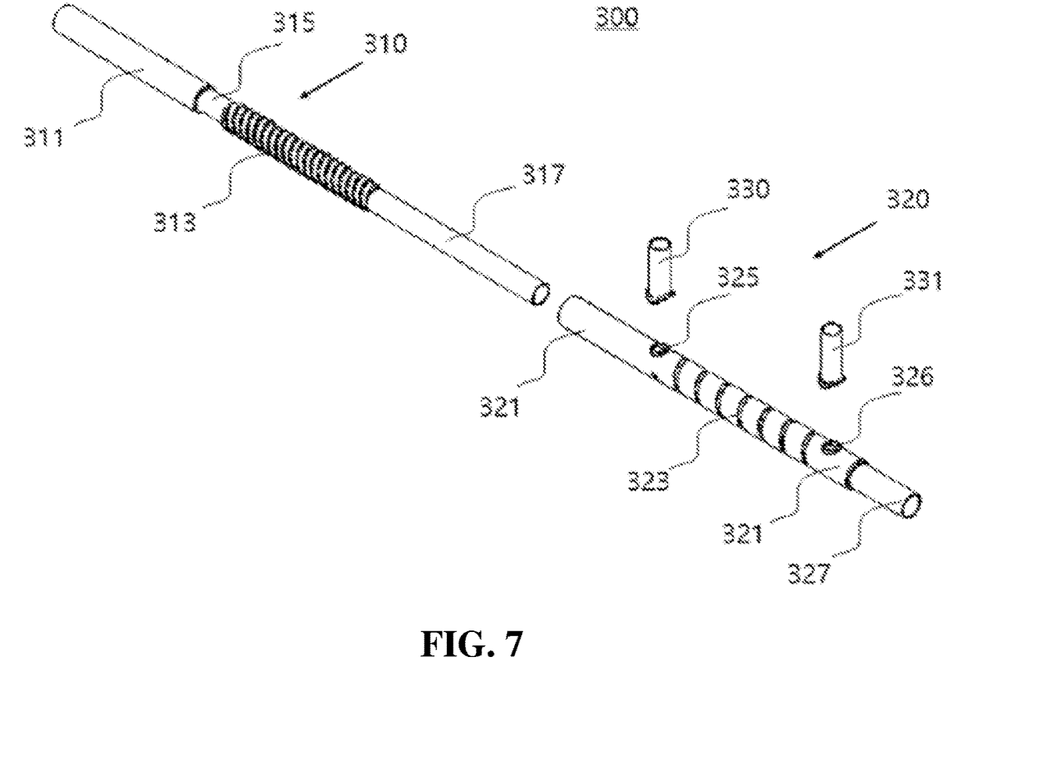
FIG. 7 is an exploded perspective view of a dual pipe according to a further embodiment of the present invention.
Figure 8:
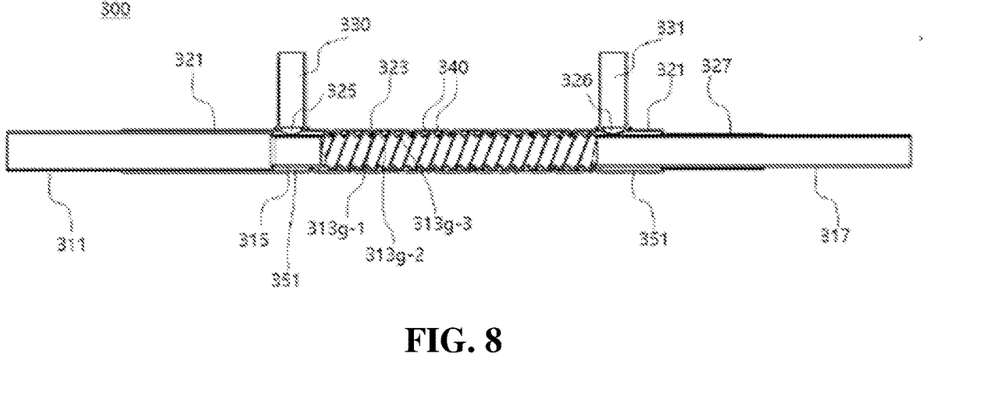
FIG. 8 is a sectional view of the dual pipe shown in FIG. 7.

FIGS. 7 and 8 show a dual pipe according to a further embodiment of the present invention.

The dual pipe 300 of the present embodiment includes an inner pipe 310 having a helical valley/ridge portion 313 formed on an outer circumferential surface thereof and an outer pipe 320 into which the inner pipe 310 is inserted. In the inner pipe 310 of the present embodiment, one triple-helix helical valley/ridge portion 313 is formed on the outer circumferential surface thereof. A single-helix helical valley/ridge portion 323 to be threadedly engaged with one helical valley/ridge portion 313g-1 of the triple-helix helical valley/ridge portion 313 of the inner pipe 310 is formed on the inner circumferential surface of the outer pipe 320.

In addition, the inner pipe 310 includes an annular groove 315 formed by reducing the outer diameter of the inner pipe 310 from one side of the triple-helix helical valley/ridge portion 313, a small-diameter connecting portion 317 formed by reducing the outer diameter of the inner pipe 310 from the other side of the triple-helix helical valley/ridge portion 313, and a large-diameter connecting portion 311 extending from the annular groove 315.

In addition, the outer pipe 320 includes a large-diameter fixing portion 321 and a small-diameter fixing portion 327. A helical outer pipe valley/ridge portion 323 to be threadedly engaged with one helical valley/ridge portion of the triple-helix helical valley/ridge portion 313 of the inner pipe 310 is formed on the inner circumferential surface of the large-diameter fixing portion 321. As shown in FIG. 7, the helical valley/ridge portion 323 of the outer pipe 320 is formed by pressing and deforming the outer circumferential surface of the outer pipe 320. Although not shown in the drawings, the helical valley/ridge portion may be formed by forming a helical rib only on the inner circumferential surface of the outer pipe 320. In addition, a first through-hole 325 and a second through-hole 326 adjacent to both ends of the helical outer pipe valley/ridge portion 323 are formed in the large-diameter fixing portion 321. Connecting pipes 330 and 331 are fixedly connected to the first and second through-holes 325 and 326, respectively.

Referring to FIG. 8, the diameter of the outer circumferential surface of the small-diameter connecting portion 317 of the inner pipe 310 is smaller than the diameter of an imaginary cylinder defined by the inner circumferential surfaces of the ridge portions of the helical outer pipe valley/ridge portion 323 formed on the inner circumferential surface of the outer pipe 320. In addition, the first through-hole 325 of the large-diameter fixing potion 321 of the outer pipe 320 is arranged to communicate with the annular groove 315 of the inner pipe 310, and the second through-hole 326 is arranged to communicate with the small-diameter connecting portion 317 of the inner pipe 310. That is, the length from the first through-hole 325 to the second through-hole 326 of the outer pipe 320 is larger than the length from the annular groove 325 of the inner pipe 310 to the end portion of the triple-helix helical valley/ridge portion 313. Therefore, a passage space 351 for allowing a high pressure refrigerant to pass therethrough is formed between the second through-hole 326 of the outer pipe 320 and the small-diameter connecting portion 317 of the inner pipe 310. In addition, the diameter of the outer circumferential surface of the large-diameter connecting portion 311 of the inner pipe 310 is set to be slightly smaller than the diameter of the inner circumferential surface of the large-diameter fixing portion 321 of the inner pipe 320. Thus, the inner pipe 310 and the outer pipe 320 have such a tolerance that the helical valley/ridge portions can be threadedly engaged with each other by rotating the inner pipe 310 or the outer pipe 320. Moreover, the diameter of the outer circumferential surface of the small-diameter connecting portion 317 of the inner pipe 310 is set to be slightly smaller than the diameter of the inner circumferential surface of the large-diameter fixing portion 327 of the outer pipe 320. Thus, the inner pipe 310 and the outer pipe 320 have such a tolerance that the helical valley/ridge portions can be threadedly engaged by rotating the inner pipe 310 or the outer pipe 320.

In addition, the outer circumferential surface of the large-diameter connecting portion 311 of the inner pipe 310 and the end portions of the large-diameter fixing portion 321 of the outer pipe 320 are fixed by brazing, and the outer circumferential surface of the small-diameter connecting portion 317 of the inner pipe 310 and the end portions of the small-diameter fixing portion 327 of the outer pipe 320 are also fixed by brazing. The high pressure refrigerant passes through the connecting pipe 331 and the second through-hole 326 of the outer pipe 320, and passes through the passage space 351 between the outer pipe 320 and the inner pipe 310. In addition, the high pressure refrigerant passing through the passage space 351 passes through a passage space 40 defined by the valleys 313g-2 and 313g-2 of the non-threadedly engaged valley/ridge portion of the triple-helix helical valley/ridge portion 313 of the inner pipe 310 and the inner circumferential surface of the outer pipe 320. The high pressure refrigerant passing through passage space 340 is discharged through the passage space 351 between the annular groove 315 of the inner pipe 310 and the first through-hole 325, the first through-hole 325 and the connecting pipe 330. The low pressure refrigerant supplied to the large-diameter portion 311 of the inner pipe 310 and passed to the small-diameter portion 317 exchanges heat with the high pressure refrigerant with the inner pipe 310 interposed therebetween.

The high pressure refrigerant passing between the outer pipe 320 and the inner pipe 310 passes through the non-threadedly-engaged passage space 340. Thus, the high pressure refrigerant has a long moving path. This makes it possible to secure a sufficient time for heat exchange and to enhance the heat exchange performance of the dual pipe 300 according to the present invention. In addition, when bending the threadedly-engaged portion of the dual pipe 300 at a required angle after both ends of the dual pipe 300 are fixed by brazing, it is possible to prevent deformation of the inner pipe 310 and the outer pipe 320 caused by the bending from propagating to the brazed potions of both ends of the outer pipe 320, because the inner pipe 310 and the outer pipe 320 are threadedly engaged at the bent portions.

In particular, if all the helical valley/ridge portions of the outer pipe 320 and the inner pipe 310 are valley/ridge portions formed by pressing the outer circumferential surfaces of the outer pipe 320 and the inner pipe 310, the helical valley/ridge portion 323 of the outer pipe 320 and the helical valley/ridge portion 313 of the inner pipe 310 are deformed in a threadedly-engaged state during the bending of the dual pipe 300. The helical valley/ridge portion is contracted on the inner side of the bent portion, and the helical valley/ridge portion is expanded on the outer side of the bent portion, thereby absorbing the deformation caused by the bending of the inner pipe 310 and the outer pipe 320. Therefore, when manufacturing the dual pipe 300, even if the dual pipe 300 is bent after both ends of the outer pipe 320 are fixed to the inner pipe 310 by brazing, it is possible to prevent deformation of the bent portions from propagating to the brazed end potions of the dual pipe 300. This makes it possible to simplify the manufacturing process.

The embodiments described above are presented to merely describe preferred embodiments of the present invention. The scope of the present invention is not limited to the above-described embodiments. Those skilled in the art may make various changes, modifications or substitutions within the spirit of the present invention and the claims. It is to be understood that such changes, modifications or substitutions fall within the scope of the present invention.

What is claimed is:

1. A dual pipe, comprising:
an inner pipe having a helical valley/ridge portion formed on an outer circumferential surface thereof; and
an outer pipe into which the inner pipe is inserted,
wherein the helical valley/ridge portion of the inner pipe includes a first helical inner pipe valley/ridge portion, a second helical inner pipe valley/ridge portion and a third helical inner pipe valley/ridge portion formed sequentially in a longitudinal direction to have the same pitch, the second helical inner pipe valley/ridge portion being a multiple-helix helical valley/ridge portion,
the inner pipe further includes a first annular groove formed by reducing an outer diameter of the inner pipe between the first helical inner pipe valley/ridge portion and the second helical inner pipe valley/ridge portion and a second annular groove formed by reducing an outer diameter of the inner pipe between the second helical inner pipe valley/ridge portion and the third helical inner pipe valley/ridge portion,
the outer pipe includes a first helical outer pipe valley/ridge portion, a second helical outer pipe valley/ridge portion and a third helical outer pipe valley/ridge portion formed on an inner circumferential surface of the outer pipe so as to be threadedly engaged with the first helical inner pipe valley/ridge portion, the second helical inner pipe valley/ridge portion and the third helical inner pipe valley/ridge portion, respectively, and
the outer pipe includes a first through-hole formed between the first helical outer pipe valley/ridge portion and the second helical outer pipe valley/ridge portion and a second through-hole formed between the second helical outer pipe valley/ridge portion and the third helical outer pipe valley/ridge portion.

2. The dual pipe according to claim 1, wherein the first helical outer pipe valley/ridge portion, the second helical outer pipe valley/ridge portion and the third helical outer pipe valley/ridge portion of the outer pipe are single-helix helical valley/ridge portions and are configured to extend integrally.

3. The dual pipe according to claim 1, wherein the first helical inner pipe valley/ridge portion and the third helical inner pipe valley/ridge portion of the inner pipe are multiple-helix helical valley/ridge portions,
the first helical outer pipe valley/ridge portion and the third helical outer pipe valley/ridge portion of the outer pipe are multiple-helix helical valley/ridge portions, and
the second helical outer pipe valley/ridge portion is a single-helix helical valley/ridge portion.

4. The dual pipe according to claim 1, wherein the inner pipe includes a smaller-diameter connecting portion extending from the third helical inner pipe valley/ridge portion and having an outer circumferential surface diameter smaller than a diameter of an imaginary cylinder defined by an inner circumferential surface of a ridge of one of the first, second and third helical valley/ridge portion formed on the inner circumferential surface of the outer pipe,
the outer pipe further includes a fixing portion extending from the third helical outer pipe valley/ridge portion, and
the dual pipe further comprises a seal ring inserted between the smaller-diameter connecting portion of the inner pipe and the fixing portion of the outer pipe.

5. The dual pipe according to claim 1, wherein the inner pipe includes a smaller-diameter connecting portion extending from the third helical inner pipe valley/ridge portion and having an outer circumferential surface diameter smaller than a diameter of an imaginary cylinder defined by an inner circumferential surface of a ridge of one of the first, second and third helical valley/ridge portions formed on the inner circumferential surface of the outer pipe, and
the outer pipe further includes a fixing portion extending from the third helical outer pipe valley/ridge portion so that a fixing portion of the inner pipe is inserted into the fixing portion of the outer pipe.

6. The dual pipe according to claim 1, wherein the first helical inner pipe valley/ridge portion, the second helical inner pipe valley/ridge portion and the third helical inner pipe valley/ridge portion of the inner pipe are formed by pressing the outer circumferential surface of the inner pipe, and
the first helical outer pipe valley/ridge portion, the second helical outer pipe valley/ridge portion and the third helical outer pipe valley/ridge portion of the outer pipe are formed by pressing the outer circumferential surface of the outer pipe.

7. A dual pipe, comprising:
an inner pipe having a helical valley/ridge portion formed on an outer circumferential surface thereof; and
an outer pipe into which the inner pipe is inserted,
wherein the helical valley/ridge portion formed on the outer circumferential surface of the inner pipe is a multiple-helix helical valley/ridge portion,
the inner pipe includes an annular groove formed by reducing an outer diameter from one side of the multiple-helix helical valley/ridge portion, a smaller-diameter connecting portion formed by reducing an outer diameter from the other side of the multiple-helix helical valley/ridge portion, and a larger-diameter connecting portion extending from the annular groove,
the outer pipe includes a larger-diameter fixing portion and a smaller-diameter fixing portion,
the larger-diameter fixing portion includes a helical outer pipe valley/ridge portion formed so as to be threadedly engaged with at least one helical valley/ridge portion of the multiple-helix helical valley/ridge portion, and first and second through-holes formed adjacent to both ends of the helical outer pipe valley/ridge portion,
the smaller-diameter connecting portion of the inner pipe has an outer circumferential surface diameter smaller than a diameter of an imaginary cylinder defined by an inner circumferential surface of a ridge formed on an inner circumferential surface of the outer pipe, and
the outer pipe is configured so that the first through-hole of the larger-diameter fixing portion communicates with the annular groove of the inner pipe and the second through-hole of the larger-diameter fixing portion communicates with the smaller-diameter connecting portion of the inner pipe.

8. The dual pipe according to claim 7, wherein the multiple-helix helical valley/ridge portion of the inner pipe is formed by pressing the outer circumferential surface of the inner pipe, and the helical outer pipe valley/ridge portion formed in the larger-diameter fixing portion of the outer pipe is formed by pressing an outer circumferential surface of the larger-diameter fixing portion of the outer pipe.

* * * * *